(12) United States Patent
Rivera

(10) Patent No.: US 12,421,990 B2
(45) Date of Patent: Sep. 23, 2025

(54) FIXTURE FOR CONNECTING A POLE TO A SURFACE

(71) Applicant: Julio Eric Rivera, Norco, CA (US)

(72) Inventor: Julio Eric Rivera, Norco, CA (US)

(\*) Notice: Subject to any disclaimer, the term of this patent is extended or adjusted under 35 U.S.C. 154(b) by 354 days.

(21) Appl. No.: 18/067,226

(22) Filed: Dec. 16, 2022

(65) Prior Publication Data

US 2023/0204059 A1 Jun. 29, 2023

Related U.S. Application Data

(60) Provisional application No. 63/265,992, filed on Dec. 23, 2021.

(51) Int. Cl.
| F16B 9/00 | (2006.01) |
| E04H 12/22 | (2006.01) |
| G09F 17/00 | (2006.01) |

(52) U.S. Cl.
CPC ......... F16B 9/052 (2018.08); E04H 12/2269 (2013.01); *G09F 2017/0075* (2013.01)

(58) Field of Classification Search
CPC ..... A01K 97/10; E04F 11/1812; E04H 12/22; E04H 12/2253; E04H 12/2269; F16B 9/05; F16B 9/052; G09F 17/00; G09F 2017/0008; G09F 2017/0075; Y10T 403/46; Y10T 403/7039
USPC .......................... 403/230, 361; 248/538, 539
See application file for complete search history.

(56) References Cited

U.S. PATENT DOCUMENTS

| 1,194,746 | A | * | 8/1916 | Keeler | F16B 2/065 248/539 |
| 2,149,781 | A | * | 3/1939 | Leiser | F16B 9/052 403/199 |
| 3,011,229 | A | * | 12/1961 | Mutchnik | F16B 9/052 403/188 |
| 3,734,549 | A | * | 5/1973 | Loov | E04F 11/1812 403/374.2 |
| 7,334,957 | B2 | * | 2/2008 | Sadinsky | E04H 12/2269 403/109.8 |
| 2021/0388631 | A1 | * | 12/2021 | Breton | E04H 12/2269 |

FOREIGN PATENT DOCUMENTS

FR 2942857 A3 * 9/2010 ............. F16B 12/24

* cited by examiner

*Primary Examiner* — Josh Skroupa
(74) *Attorney, Agent, or Firm* — Sisson & Banyas, Attorneys at Law, LLC; Edwin A. Sisson; Jeffrey J. Banyas

(57) ABSTRACT

A fixture for connecting a pole to a surface comprises a mounting plate, a receiver, and at least one locking mechanism. The mounting plate having a mounting plate perimeter defining a mounting plate top surface and a mounting plate bottom surface. The mounting plate comprising at least two mounting holes. The receiver being attached to the mounting plate top surface. The receiver comprising at least one sidewall defining a hollow interior and at least one locking hole passing through the sidewall. The at least one locking mechanism configured to interact with the at least one locking hole.

18 Claims, 8 Drawing Sheets

FIXTURE FOR CONNECTING A POLE TO A SURFACE

CROSS REFERENCES AND PRIORITIES

This Application claims priority from U.S. Provisional Application No. 63/265,992 filed on 23 Dec. 2021 the teachings of which are incorporated by reference herein in their entirety.

BACKGROUND

Connecting a pole—such as that used to support a flag, umbrella, or the like—to a surface serves many useful purposes. Doing so allows individuals to use or display their device (flag, umbrella, or the like) without the need for a person to physically hold the device. This is considered particularly beneficial when the user intends to connect the device to a surface of a vehicle—such as a pickup truck.

Many solutions have been proposed for connecting a pole to a surface. The simplest solutions involve the use of flexible materials such as rope, tape, flexible clamps, cable ties, u-bolts, or the like which wrap around at least a portion of the pole and connect to the surface. In practice, the flexible nature of these solutions often results in a pole which is not securely connected to the surface. This is particularly the case when the device is a flag or umbrella which is subjected to various force vectors primarily from wind. The lack of secure connection may result in the pole scratching the surface to which it is connected and—in extreme cases—may result in the pole coming dislodged from the surface.

Other solutions have been proposed involving the use of rigid connection devices such as rigid clamps, pipes, or the like which wrap around at least a portion of the pole and connect to the surface. In practice, these solutions often require significant modification to the surface—such as by drilling or boring holes in the surface. These solution have also been found insufficient to prevent the pole from coming dislodged from the surface by forces—such as those imposed by the wind—having a force vector which is substantially opposite the force of gravity.

The need exists, therefore, for an improved device for connecting a pole to a surface in a secure manner while limiting or eliminating damage or modifications to the surface.

SUMMARY

Described herein is a fixture for connecting a pole to a surface. The fixture comprises a mounting plate and a receiver. The mounting plate has a mounting plate perimeter defining a mounting plate top surface and a mounting plate bottom surface. The mounting plate further comprises at least two mounting holes. The receiver is attached to the mounting plate top surface. The receiver comprises at least one sidewall defining a hollow interior. The receiver further comprises at least one locking hole passing through the sidewall and configured to interact with at least one locking mechanism.

In some embodiments, the at least one locking mechanism may be selected from the group consisting of one or more spring-loaded pins, one or more bolts, one or more clamps, one or more cotter pins, and combinations thereof.

In certain embodiments, the fixture may further comprise a cradle. When present, the cradle may comprise at least a first plate extending substantially perpendicular from the mounting plate top surface and attached between the mounting plate top surface and the at least one sidewall.

In some embodiments comprising a cradle, the cradle may comprise a first cradle plate and a second cradle plate. The first cradle plate may have at least a first cradle plate first edge, a first cradle plate second edge opposite the first cradle plate first edge, a first cradle plate first end, and a first cradle plate second end opposite the first cradle plate first end. The second cradle plate may have at least a second cradle plate first edge, a second cradle plate second edge opposite the second cradle plate first edge, a second cradle plate first end, and a second cradle plate second end opposite the second cradle plate first end. The first cradle plate first edge may be attached to a first location on the mounting plate top surface. The first cradle plate second edge may be attached to a first location on the at least one sidewall. The second cradle plate first edge may be attached to a second location on the mounting plate top surface. The second cradle plate second edge may be attached to a second location on the at least one sidewall.

In certain embodiments comprising a first cradle plate and a second cradle plate, the cradle may further comprise a third cradle plate. When present, the third cradle plate may be attached to and span a distance between the first cradle plate second end and the second cradle plate second end. In some embodiments, the third cradle plate may comprise at least one drain hole.

In certain embodiments comprising a first cradle plate, a second cradle plate, and an (optional) third cradle plate, the cradle may further comprise a fourth cradle plate. The fourth cradle plate, when present, may be attached to and span a distance between the first cradle plate first end and the second cradle plate first end.

In some embodiments comprising a first cradle plate and a second cradle plate, the first cradle plate first edge may comprise at least one first cradle plate protrusion. In such embodiments, the mounting plate may comprise at least one first indentation configured to receive the at least one first cradle plate protrusion.

In certain embodiments comprising a first cradle plate and a second cradle plate, the second cradle plate first edge may comprise at least one second cradle plate protrusion. In such embodiments, the mounting plate may comprise at least one second indentation configured to receive the at least one second cradle plate protrusion.

In some embodiments, the fixture may further comprise at least one spacer. When present, the spacer may have a spacer perimeter defining a spacer top surface and a spacer bottom surface. The spacer may comprise at least two spacer holes passing from the spacer top surface through the spacer bottom surface. In certain such embodiments, the spacer perimeter may have a first size and shape corresponding to a second size and shape of the mounting plate perimeter. In some such embodiments, the at least two spacer holes may be configured to substantially align with the at least two mounting holes.

In certain embodiments, the fixture may further comprise a cover. The cover, when present, may be connected to at least a portion of the at least one sidewall. When present, the cover may have a third size and shape substantially configured to a fourth size and shape of at least a portion of the at least one sidewall.

In some embodiments comprising a cover, the cover may comprise at least two through holes. In such embodiments, the cradle may comprise at least two cover fastening holes, and the cover may be connected to at least a portion of the sidewall by independently passing a separate cover fastener through each of the two through holes and into each of the two cover fastening holes. In certain embodiments, the cover fastener may be selected from the group consisting of a screw, a bolt, a rivet, and a pin.

Also described herein is a pole and fixture assembly. The pole and fixture assembly comprises a fixture of any type disclosed herein and a pole. The pole is configured to fit within at least a portion of the hollow interior. The fixture is configured to attach to a surface.

In some embodiments, the surface may be selected from the group consisting of an interior surface of a truck bed sidewall, an exterior surface of a vehicle, an exterior surface of a trailer, and an exterior surface of a building.

In certain embodiments, the pole may be connected to at least one device selected from the group consisting of a flag, an umbrella, a light source, and combinations thereof.

In some embodiments of the pole and fixture assembly the pole may comprise a locking mechanism. In such embodiments, the fixture may comprise a locking hole. The locking mechanism may be configured to interact with the locking hole. The locking mechanism may be selected from the group consisting of a spring-loaded pin, a bolt, a clamp, a cotter pin, and combinations thereof.

DETAILED DESCRIPTION

Disclosed herein is a fixture for connecting a pole to a surface. Also disclosed herein is a pole and fixture assembly. The fixture, and the pole and fixture assembly are described below with reference to the Figures. As described herein and in the claims, the following numbers refer to the following structures noted in the Figures.

10 refers to a pole.
15 refers to a locking mechanism.
20 refers to a surface.
50 refers to a pole and fixture assembly.
100 refers to a fixture.
110 refers to a mounting plate.
111 refers to a mounting plate perimeter.
112 refers to a mounting plate top surface.
113 refers to a mounting plate bottom surface.
114 refers to a mounting hole.
117 refers to a first indentation.
118 refers to a second indentation.
119 refers to a recess.
120 refers to a receiver.
121 refers to a sidewall.
122 refers to a hollow interior.
123 refers to a locking hole.
200 refers to a cradle.
210 refers to a first cradle plate.
211 refers to a first cradle plate first edge.
212 refers to a first cradle plate second edge.
213 refers to a first cradle plate first end.
214 refers to a first cradle plate second end.
215 refers to a first cradle plate protrusion.
220 refers to a second cradle plate.
221 refers to a second cradle plate first edge.
222 refers to a second cradle plate second edge.
223 refers to a second cradle plate first end.
224 refers to a second cradle plate second end.
225 refers to a second cradle plate protrusion.
230 refers to a third cradle plate.
231 refers to a drain hole.
240 refers to a fourth cradle plate.
250 refers to a cover fastening hole.
300 refers to a spacer.
310 refers to a spacer perimeter.
320 refers to a spacer top surface.
330 refers to a spacer bottom surface.
340 refers to a spacer hole.
400 refers to a cover.
410 refers to a through hole.
420 refers to a cover fastener.

Figure 1:
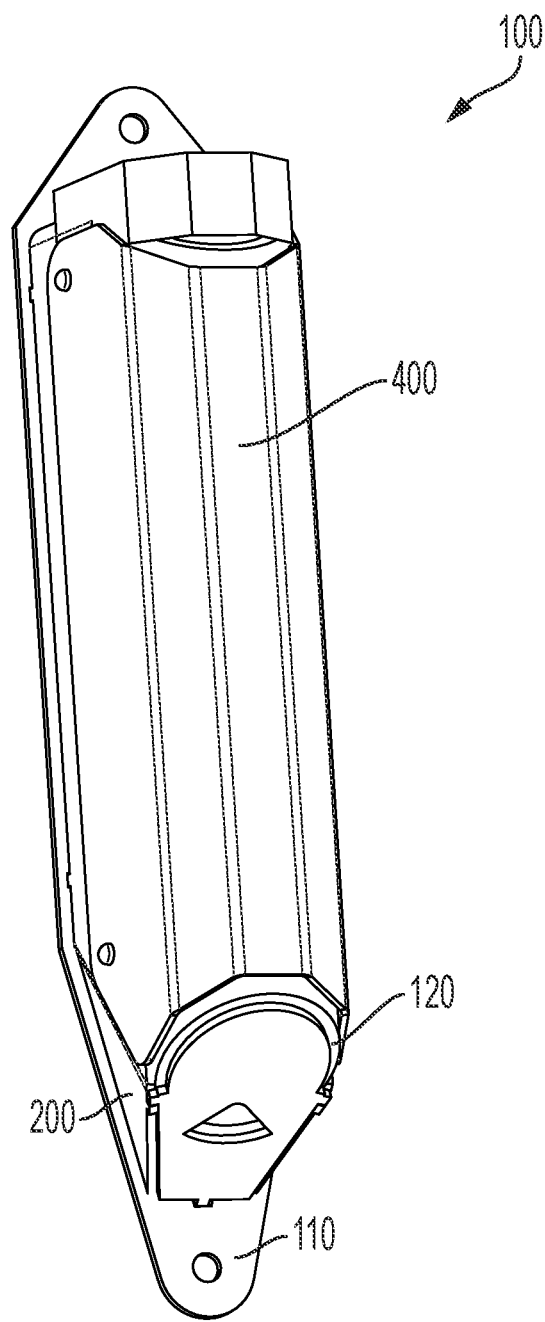
FIG. 1 is a perspective view of one embodiment of a fixture for connecting a pole to a surface.
Figure 2:
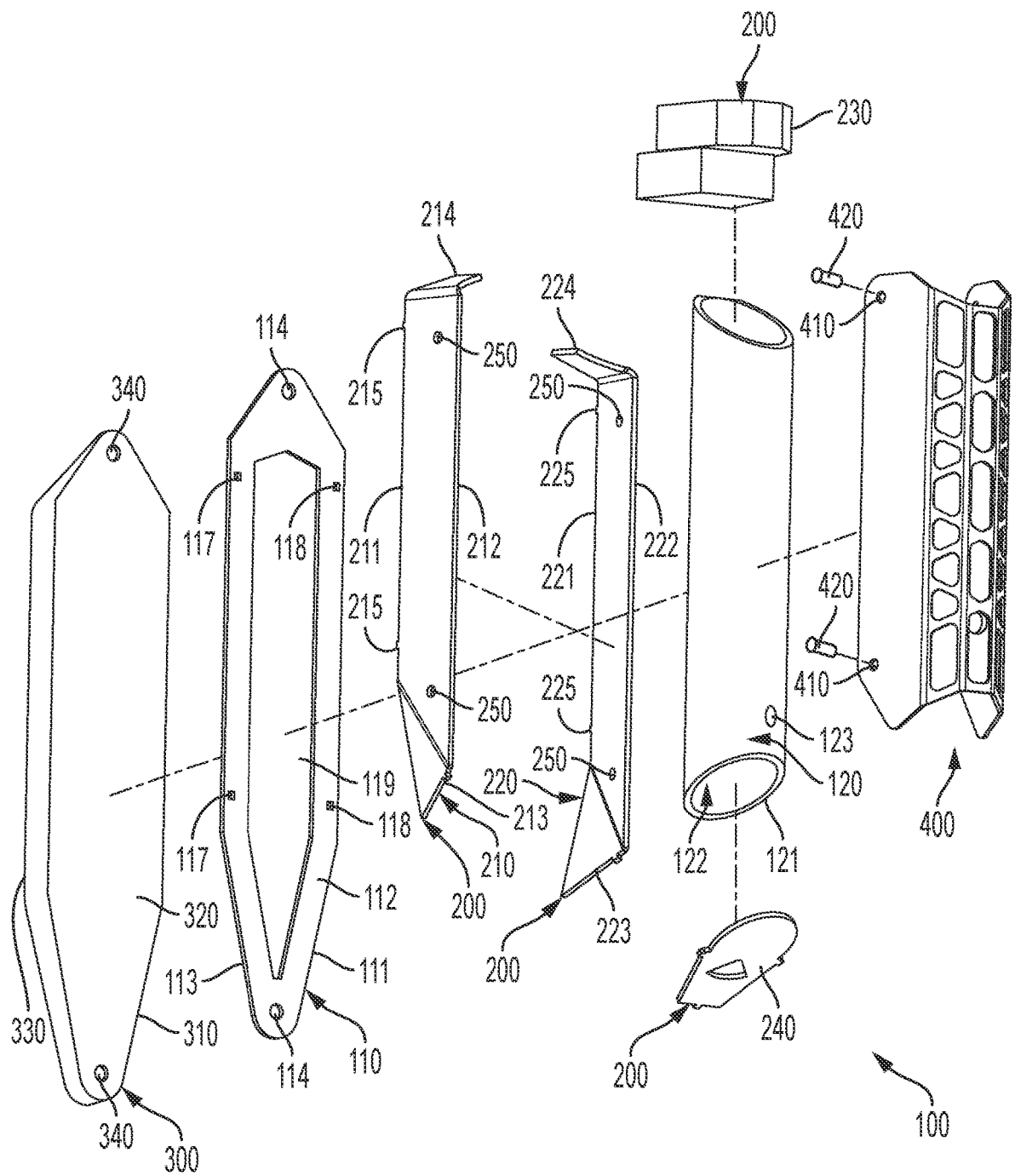
FIG. 2 is an exploded perspective view of the embodiment of a fixture with an optional spacer.
Figure 5:
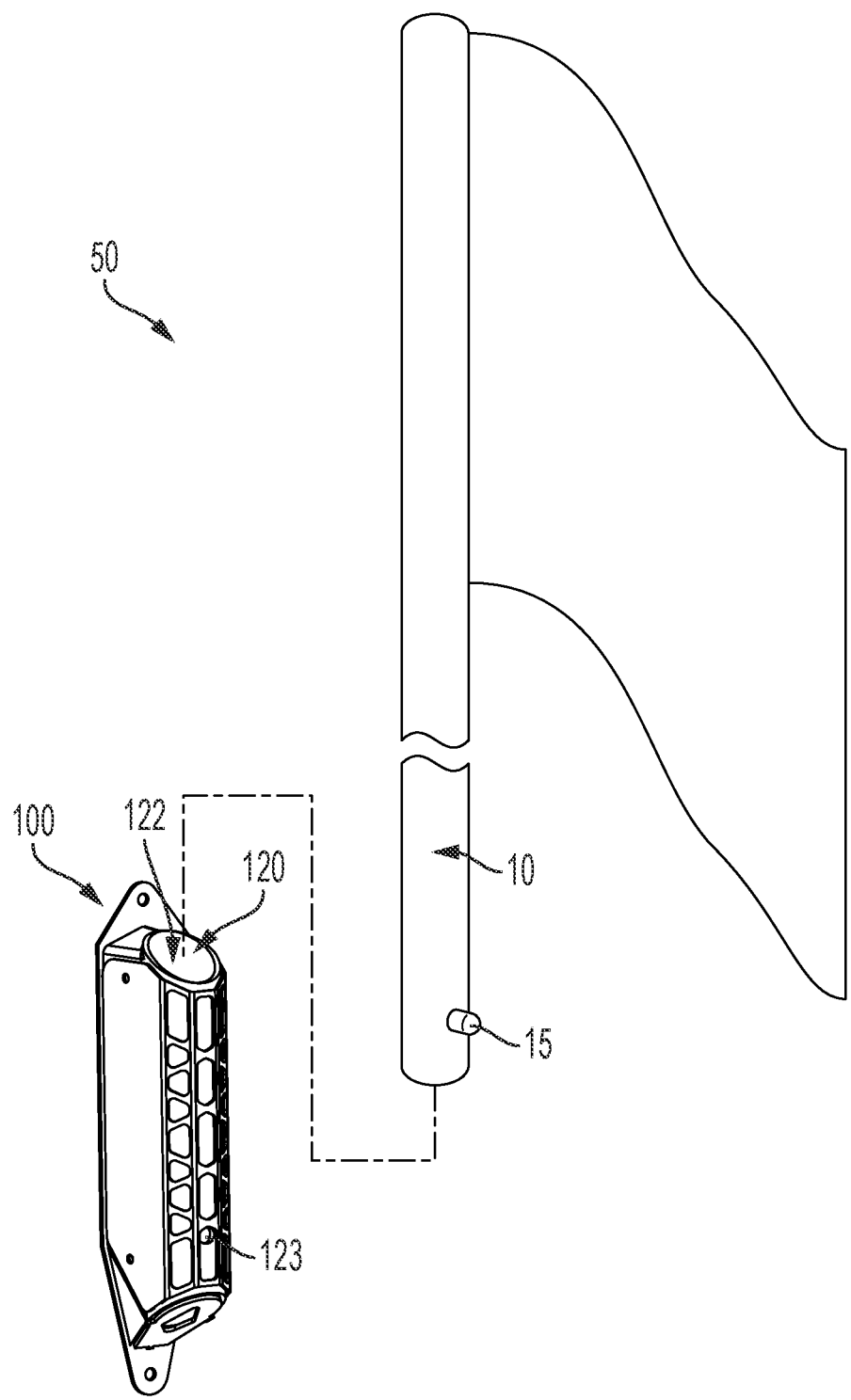
FIG. 5 is an exploded perspective view of a fixture and pole assembly.
Figure 6:
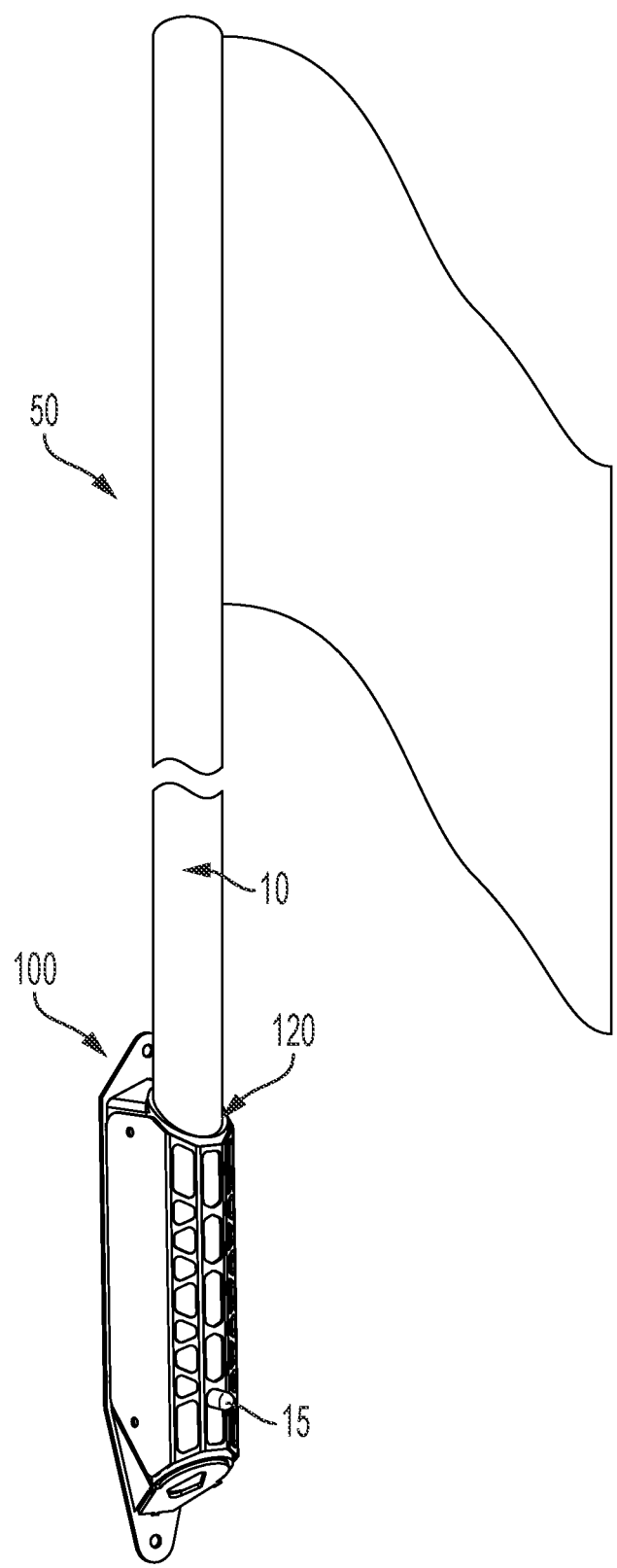
FIG. 6 is an assembled perspective view of the fixture and pole assembly of FIG. 5.
Figure 7:
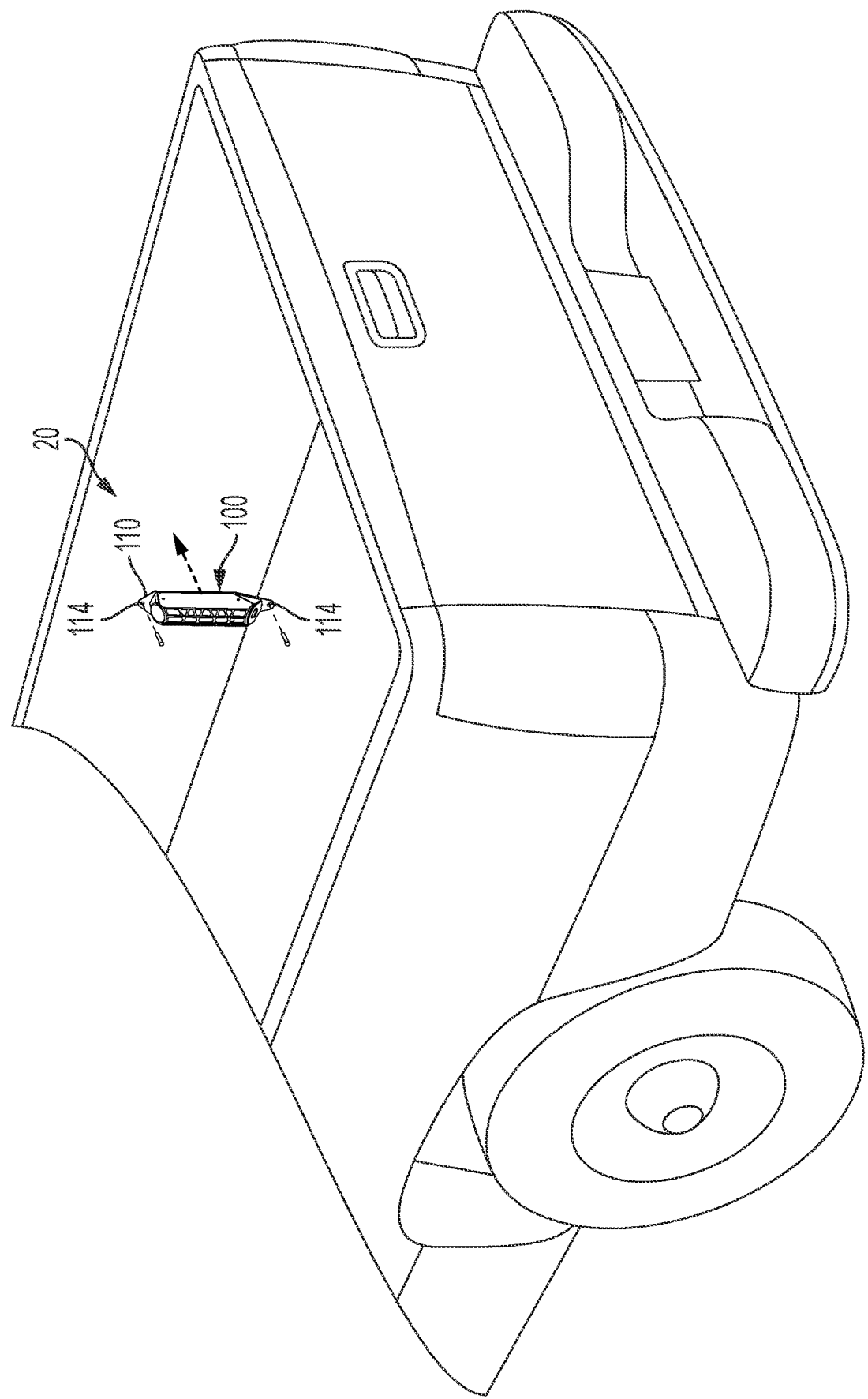
FIG. 7 is an exploded perspective view of a fixture and an interior surface of a truck bed sidewall.
Figure 8:
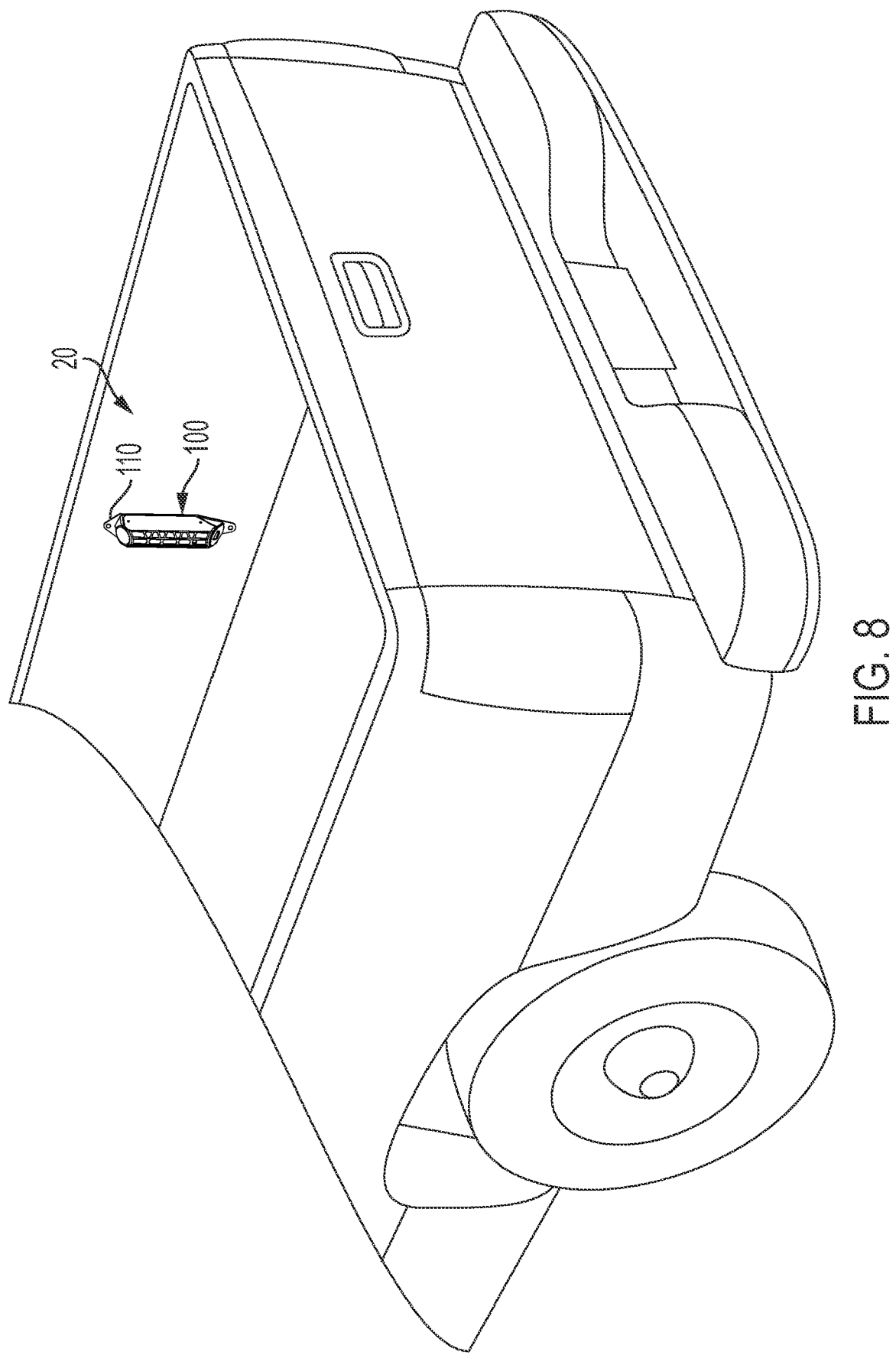
FIG. 8 is an assembled perspective view of the fixture and interior surface of a truck bed sidewall of FIG. 7.

FIG. 1 and FIG. 2 show assembled (FIG. 1) and exploded (FIG. 2) views of an embodiment of a fixture (100) for connecting a pole (10 as shown in FIG. 5 and FIG. 6) to a surface (20 as shown in FIG. 7 and FIG. 8). As shown in FIG. 1, the fixture comprises a mounting plate (110), a receiver (120), and at least one locking mechanism (15 as shown in FIG. 5). The receiver may also comprise an optional cradle (200) and/or an optional cover (400) as shown in FIG. 1.

FIG. 2 shows additional features of the mounting plate (110). As shown in FIG. 2, the mounting plate has a mounting plate perimeter (111). While the mounting plate shown in FIG. 2 has an oblong perimeter shape having rounded corners at opposing ends, other perimeter shapes may be utilized. Non-limiting examples of mounting plate perimeter shapes include a triangle, a quadrilateral (such as a square or rectangle), a heptagon, and an octagon.

The mounting plate perimeter (111) defines a mounting plate top surface (112) and a mounting plate bottom surface (113) which is opposite the mounting plate top surface. As shown in FIG. 2, the mounting plate (110) further comprises at least two mounting holes (114). Each mounting hole originates at the mounting plate bottom surface and pass through at least a portion of the mounting plate. In some embodiments, one or more of the mounting holes may originate at the mounting plate bottom surface and pass through the mounting plate top surface (also known as a "through hole"). In other embodiments, one or more of the mounting holes may originate at the mounting plate bottom surface without passing through the mounting plate top surface (also known as a "blind hole"). When one or more of the mounting holes is a blind hole, the mounting hole may comprise internal threads adapted to receive a fastener such as a bolt or screw. While FIG. 2 shows the mounting plate comprising two mounting holes at opposing ends of the mounting plate, other configurations and numbers of mounting holes may be utilized. In general, the number of mounting holes may be an integer in the range of between 2 and 25.

In some embodiments, such as shown in FIG. 2, the mounting plate (110) may further comprise one or more first indentations (117) and/or one or more second indentations (118). When present, each first indentation may be configured to receive a first cradle protrusion (215) of a first cradle plate (210) as described herein. Similarly, when present, each second indentation may be configured to receive a second cradle protrusion (225) of a second cradle plate (220) as described herein. As shown in FIG. 2, the indentation(s) originate at the mounting plate top surface (112). One of ordinary skill will recognize that—in some embodiments—the indentation(s) pass through the mounting plate bottom surface (113) while—in other embodiments—the indentation(s) do not pass through the mounting plate bottom surface.

In certain embodiments, the mounting plate (110) may also comprise one or more recesses (119). When present, each recess may originate at the mounting plate bottom surface (113) and/or the mounting plate top surface (112) and pass through at least a portion of the mounting plate. In some embodiments, one or more of the recesses may originate at the mounting plate bottom surface and pass through the mounting plate top surface. In other embodiments, one or more of the recesses may originate at the mounting plate bottom surface without passing through the mounting plate top surface. In still other embodiments, one or more of the recesses may originate at the mounting plate top surface without passing through the mounting plate bottom surface.

FIG. 2 also shows additional features of the receiver (120). As shown in FIG. 2, the receiver comprises at least one sidewall (121) defining a hollow interior (122). While FIG. 2 shows the receiver having a single curved sidewall forming a circular radial cross-sectional profile, other configurations may exist. For example, in some embodiments, the receiver may comprise three flat sidewalls forming a triangular radial cross-sectional profile. In other embodiments, the receiver may comprise four flat sidewalls forming a quadrilateral radial cross-sectional profile. In still other embodiments, the receiver may comprise six flat sidewalls forming a hexagonal radial cross-sectional profile. In yet other embodiments, the receiver may comprise eight flat sidewalls forming an octagonal radial cross-sectional profile. In general, the sidewall(s) and the hollow interior should be sized and shaped to correspond with the size and shape of a pole (10 as shown in FIGS. 5 and 6) which is to be inserted into the hollow interior.

The receiver (120) also comprises at least one locking hole (123) which passes through the sidewall (121). In general, the size, shape, and location of the locking hole should be selected to interact with the type of locking mechanism (15) as described herein. While FIG. 2 shows a single locking hole, other embodiments may exist. As such, the number of locking holes may be an integer in the range of between 1 and 25 with each locking hole independently being of a size, shape, and at a location configured to interact with at least one locking mechanism. In some embodiments, the locking hole may be threaded to allow for a threaded fastener to tighten into the pole.

Further shown in FIG. 2 are additional features of an optional cradle (200). When present, the cradle will comprise at least a first cradle plate (210). Preferably, the (optional) cradle will comprise a first cradle plate and a second cradle plate (220). The first cradle plate—when present—may have at least a first cradle plate first edge (211), a first cradle plate second edge (212) opposite the first cradle plate first edge, a first cradle plate first end (213), and a first cradle plate second end (214) opposite the first cradle plate first end. Similarly, when present, the second cradle plate may have at least a second cradle plate first edge (221), a second cradle plate second edge (222) opposite the second cradle plate first edge, a second cradle plate first end (223), and a second cradle plate second end (224) opposite the second cradle plate first end. Each of the first cradle plate and the second cradle plate may be attached to and extend between the mounting plate top surface (112) and the at least one sidewall (121) as described herein.

In certain embodiments, the first cradle plate first edge (211) may comprise at least one first cradle plate protrusion (215). When present, each first cradle plate protrusion may be configured to interact with a first indentation (117) of the mounting plate (110) as described herein. Similarly, in some embodiments, the second cradle plate first edge (221) may comprise at least one second cradle plate protrusion (225). When present, each second cradle plate protrusion may be configured to interact with a second indentation (118) of the mounting plate as described herein.

Figure 4:
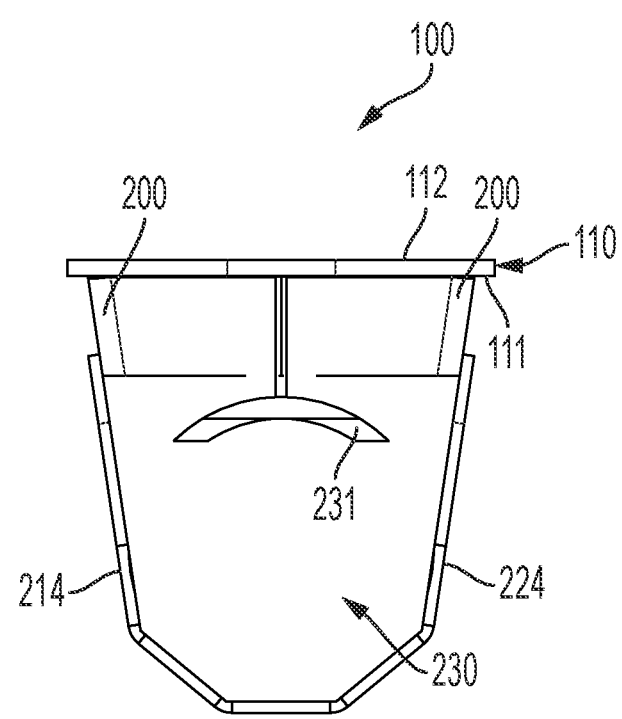
FIG. 4 is a bottom end view of the embodiment of a fixture of FIG. 1.

In some embodiments, the (optional) cradle (200) may further comprise a third cradle plate (230) as shown in FIG. 2. The third cradle plate may be configured to attach to and span a distance between the first cradle plate second end (214) and the second cradle plate second end (224). In some embodiments, the third cradle plate may comprise at least one drain hole (231 as shown in FIG. 4) originating at a top surface of the third cradle plate and passing through a bottom surface of the third cradle plate. The size and shape of the drain hole is not considered important, but in general the drain hole should be sized and shaped to allow liquid—such as rainwater—to flow out of the hollow interior (122) of the receiver (120) without allowing the pole (10 as shown in FIG. 5 and FIG. 6) to exit the bottom of the receiver.

The (optional) cradle (200) may also comprise a fourth cradle plate (240). The fourth cradle plate may be configured to attach to and span a distance between the first cradle plate first end (213) and the second cradle plate first end (223) as described herein.

In some embodiments, the cradle (200) may further comprise at least two cover fastening holes (250). When present, the cover fastening holes will originate from an outer surface of one or more of the cradle plate(s) (210, 220, 230, 240) and pass through at least a portion of the wall of said cradle plate(s). In some embodiments, one or more of the cover fastening holes originates from the outer surface of the cradle plate(s) and passes through the inner surface of the cradle plate(s) (also known as a "through hole"). In other embodiments, one or more of the cover fastening holes originates from the outer surface of the cradle plate(s) without passing through the inner surface of the cradle plate(s) (also known as a "blind hole"). In general, each cover fastening hole will be of a size and shape, and at a location configured to receive a cover fastener (420) as described herein.

In some embodiments, the fixture (100) may also comprise at least one optional spacer (300). FIG. 2 shows additional features of the optional spacer. The simplest embodiment of a spacer(s) comprise a hollow cylinder through which fasteners may pass after passing through the mounting holes (114) of the mounting plate (110).

In the embodiment shown in FIG. 2, the spacer (300) has a spacer perimeter (310) defining a spacer top surface (320) and a spacer bottom surface (330). The spacer embodiment shown in FIG. 2 also comprises at least two spacer holes (340) passing from the spacer top surface through the spacer bottom surface. The number and location of spacer holes will be selected such that each spacer hole is substantially aligned with at least one mounting hole (114) of the mounting plate (110). While the spacer size and shape is not considered important, in some embodiments the spacer perimeter will have a first size and shape corresponding to a second size and shape of the mounting plate perimeter (111). That is to say that, when the mounting plate perimeter has an oblong perimeter shape having rounded corners at opposing ends as shown in FIG. 2, the spacer perimeter will also have an oblong perimeter shape having rounded corners at opposing ends.

Also shown in FIG. 2 are additional features of an optional cover (400). In general, the cover—when present—will have a size and shape substantially configured to a size and shape of at least a portion of the at least one sidewall (121) such that the cover may be connected to the at least a portion of the at least one sidewall as described herein. That is to say that, when the sidewall has a cylindrical radial cross-sectional profile as shown in FIG. 2, the cover may also have a semi-cylindrical radial cross-sectional profile as shown in FIG. 2.

In some embodiments, the (optional) cover (400) may comprise at least two through holes (410). When present, each through hole may be sized and shaped, and at a location, corresponding to the size, shape, and location of at least one cover fastening hole (250) such that the cover may be connected to the at least a portion of the cradle by passing cover fasteners (420) through the through holes and into the cover fastening holes as described herein.

Figure 3:
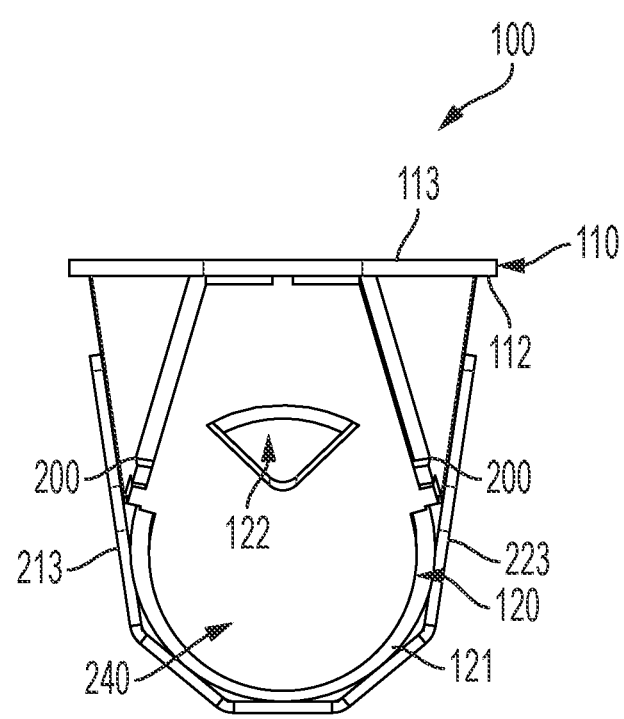
FIG. 3 is a top end view of the embodiment of a fixture of FIG. 1.

As shown in FIG. 1, FIG. 3, and FIG. 4, the receiver (120) may be attached to the mounting plate top surface (112) with or without including a cradle (200). In some embodiments including a cradle comprising a first cradle plate (210), the first cradle plate may extend substantially perpendicular from the mounting plate top surface and attach between the mounting plate top surface and the at least one sidewall (121) of the receiver. The attachment between the first cradle plate and the mounting plate top surface may be a permanent attachment—such as welding the first cradle plate first edge (211) to the mounting plate top surface or manufacturing the first cradle plate and the mounting plate of a single integral piece of material—or a non-permanent attachment—such as connecting the first cradle plate to the mounting plate top surface by way of a fastener such as a screw, bolt, rivet, or the like. Similarly, the attachment between the first cradle plate and the sidewall of the receiver may be a permanent attachment—such as welding the first cradle plate second edge (212) to the sidewall or manufacturing the first cradle plate and the receiver of a single integral piece of material—or a non-permanent attachment—such as connecting the first cradle plate to the sidewall by way of a fastener such as a screw, bolt, rivet, or the like.

In some embodiments including a cradle (200), the first cradle plate first edge (211) may be attached to a first location on the mounting plate top surface (112) with the first cradle plate second edge (212) attached to a first location on the at least one sidewall (121). Similarly, the second cradle plate first edge (221) may be attached to a second location on the mounting plate top surface with the second cradle plate second edge (222) attached to a second location on the at least one sidewall. Like the first cradle plate, the attachment between the second cradle plate and the mounting plate top surface may be a permanent attachment—such as welding the second cradle plate first edge to the mounting plate top surface or manufacturing the second cradle plate and the mounting plate of a single integral piece of material—or a non-permanent attachment—such as connecting the second cradle plate to the mounting plate top surface by way of a fastener such as a screw, bolt, rivet, or the like. Similarly, the attachment between the second cradle plate and the sidewall of the receiver (120) may be a permanent attachment—such as welding the second cradle plate second edge to the sidewall or manufacturing the second cradle plate and the receiver of a single integral piece of material—or a non-permanent attachment—such as connecting the second cradle plate to the sidewall by way of a fastener such as a screw, bolt, rivet, or the like.

In certain embodiments, the first cradle plate first edge (211) may comprise at least one first cradle plate protrusion (215) and/or the second cradle plate first edge (221) may comprise at least one second cradle plate protrusion (225). When present, each first cradle plate protrusion is configured to interact with a corresponding first indentation (117) of the mounting plate (110) to properly locate the first cradle plate (210) at the first location on the mounting plate top surface (112). The first cradle plate may then be attached to the mounting plate top surface by either a permanent attachment or a non-permanent attachment as described herein. Similarly, when present, each second cradle plate protrusion is configured to interact with a corresponding second indentation (118) of the mounting plate to properly locate the second cradle plate (220) at the second location on the mounting plate top surface. The second cradle plate may then be attached to the mounting plate top surface by either a permanent attachment or a non-permanent attachment as described herein.

The number and location of the first cradle plate protrusion(s)/first indentation(s) and second cradle plate protrusion(s)/second indentation(s) is not considered important. In general the number of first cradle plate protrusion(s), first indentation(s), second cradle plate protrusion(s), and second indentation(s) may each independently be an integer in the range of between 1 and 50. Preferably, the number of first cradle plate protrusions will equal the number of first indentations. Similarly, it is preferred that the number of second cradle plate protrusions equal the number of second indentations.

FIG. 3 illustrates a top end view of one embodiment of a fixture (100). As shown in FIG. 3, the fourth cradle plate (240)—when present—may be attached to and span a distance between the first cradle plate first end (213) and the second cradle plate first end (223). The attachment between the fourth cradle plate and the first cradle plate first end, as well as the connection between the fourth cradle plate and the second cradle plate first end may each independently be selected from a permanent connection—such as welding the fourth cradle plate to the first cradle plate first end/second cradle plate first end or manufacturing the fourth cradle plate and the first cradle plate/second cradle plate of a single integral piece of material—or a non-permanent attachment—such as connecting the fourth cradle plate to the first cradle plate first end/second cradle plate first end by way of a fastener such as a screw, bolt, rivet, or the like.

FIG. 4 shows a bottom end view of one embodiment of a fixture (100). As shown in FIG. 4, the third cradle plate (230 as shown in FIG. 2)—when present—may be attached to and span a distance between the first cradle plate second end (214 as shown in FIG. 2) and the second cradle plate second end (224). The attachment between the third cradle plate and the first cradle plate second end, as well as the connection between the third cradle plate and the second cradle plate second end may each independently be selected from a permanent connection—such as welding the third cradle plate to the first cradle plate second end/second cradle plate second end or manufacturing the third cradle plate and the first cradle plate/second cradle plate of a single integral piece of material—or a non-permanent attachment—such as connecting the third cradle plate to the first cradle plate second end/second cradle plate second end by way of a fastener such as a screw, bolt, rivet, or the like.

FIG. 5 and FIG. 6 show disassembled (FIG. 5) and assembled (FIG. 6) embodiments of a pole and fixture assembly (50). As shown in FIG. 5, the pole (10) comprises a longitudinal section of rigid material such as aluminum, steel, stainless steel, or rigid plastic. In general, the pole will be sized and shaped to correspond with the size and shape of the hollow interior (122) of the receiver (120) of the fixture (100) such that the pole can fit within at least a portion of the hollow interior.

FIG. 6 shows the pole (10) disposed into the hollow interior of the receiver (120) of the fixture (100). As shown in FIG. 5 and FIG. 6, the locking mechanism (15) consists of a spring-loaded pin attached to the pole. As the pole is inserted into the hollow interior of the receiver, the spring-loaded pin retracts inwardly towards the central axis of the pole. When the spring loaded pin reaches the locking hole (123), the spring loaded pin extends outwardly into the locking hole to securely connect the pole to the fixture.

While FIG. 5 and FIG. 6 show the locking mechanism (15) in the form of a spring-loaded pin, other embodiments of a locking mechanism may exist. Non-limiting examples of a locking mechanism include one or more spring-loaded pins, one or more bolts, one or more clamps, one or more cotter pins, and combinations thereof.

FIG. 7 and FIG. 8 show disassembled (FIG. 7) and assembled (FIG. 8) embodiments of a fixture (100) connected to a surface (20) which in this case is an interior side wall of a truck bed. While FIG. 7 and FIG. 8 show the fixture connected to an interior surface of a truck bed sidewall, the fixture may be connected to any number of other surfaces. Nonlimiting examples of surfaces to which the fixture may be connected include an interior surface of a truck bed sidewall, an exterior surface of a vehicle, an exterior surface of a trailer, and an exterior surface of a building. The fixture may be connected to the surface by an number of mechanisms including fasteners such as bolts, screws, pins, rivets, clamps, and the like. In general, the fixture will be connected to the surface by passing the fastener(s) through the mounting hole(s) (114) and into corresponding holes in the surface.

The fixtures disclosed herein allow for a pole to securely connect to a surface with minimal or no modifications needed to the surface. The fixture also connects the pole to the surface in a manner that reduces or eliminates movement of the pole caused by wind forces.

What is claimed is:

1. A fixture (100) for connecting a pole (10) to a surface (20) comprising:
   a mounting plate (110) having a mounting plate perimeter (111) defining a mounting plate top surface (112) and a mounting plate bottom surface (113), said mounting plate comprising at least two mounting holes (114);
   a receiver (120) attached to the mounting plate top surface, said receiver comprising at least one sidewall (121) defining a hollow interior (122), and at least one locking hole (123) passing through the sidewall and configured to interact with at least one locking mechanism (15); and
   a cover (400) connected to at least a portion of the at least one sidewall, said cover having a third size and shape substantially configured to a fourth size and shape of at least a portion of the at least one sidewalls; and
wherein the cover comprises at least two through holes (410), the cradle comprises at least two cover fastening holes (250), and the cover is connected to at least a portion of the sidewall by independently passing a separate cover fastener (420) through each of the two through holes and into each of the two cover fastening holes.

2. The fixture of claim 1, wherein the cover fastener is selected from the group consisting of a screw, a bolt, a rivet, and a pin.

3. A pole and fixture assembly (50) comprising:
   the fixture of claim 1; and
   a pole (10) configured to fit within at least a portion of the hollow interior; and
wherein the fixture is configured to attach to a surface (20).

4. The pole and fixture assembly of claim 3, wherein the surface is selected from the group consisting of an interior surface of a truck bed sidewall, an exterior surface of a vehicle, an exterior surface of a trailer, and an exterior surface of a building.

5. The pole and fixture assembly of claim 3, wherein the pole is connected to at least one device selected from the group consisting of a flag, an umbrella, a light source, and combinations thereof.

6. The pole and fixture assembly of claim 3, wherein the pole comprises a locking mechanism (15), the fixture comprises the locking hole (123), and the locking mechanism is configured to interact with the locking hole.

7. The pole and fixture assembly of claim 6, wherein the locking mechanism is selected from the group consisting of a spring-loaded pin, a bolt, a clamp, a cotter pin, and combinations thereof.

8. The fixture of claim 1, wherein the at least one locking mechanism is selected from the group consisting of one or more spring-loaded pins, one or more bolts, one or more clamps, one or more cotter pins, and combinations thereof.

9. The fixture of claim 1, further comprising a cradle (200).

10. The fixture of claim 9, wherein the cradle comprises a first cradle plate (210) extending substantially perpendicular from the mounting plate top surface and attached between the mounting plate top surface and the at least one sidewall.

11. The fixture of claim 9, wherein the cradle comprises:
   a first cradle plate (210) having at least a first cradle plate first edge (211), a first cradle plate second edge (212) opposite the first cradle plate first edge, a first cradle plate first end (213), and a first cradle plate second end (214) opposite the first cradle plate first end; and
   a second cradle plate (220) having at least a second cradle plate first edge (221), a second cradle plate second edge (222) opposite the second cradle plate first edge, a second cradle plate first end (223), and a second cradle plate second end (224) opposite the second cradle plate first end; and
wherein the first cradle plate first edge is attached to a first location on the mounting plate top surface, the first cradle plate second edge is attached to a first location on the at least one sidewall, the second cradle plate first edge is attached to a second location on the mounting plate top surface, and the second cradle plate second edge is attached to a second location on the at least one sidewall.

12. The fixture of claim 11, wherein the cradle further comprises a third cradle plate (230) attached to and spanning a distance between the first cradle plate second end and the second cradle plate second end.

13. The fixture of claim 12, wherein the third cradle plate comprises at least one drain hole (231).

14. The fixture of claim 11, wherein the cradle further comprises a fourth cradle plate (240) attached to and spanning a distance between the first cradle plate first end and the second cradle plate first end.

15. The fixture of claim 11, wherein the first cradle plate first edge comprises at least one first cradle plate protrusion (215), and the mounting plate comprises at least one first indentation (117) configured to receive the at least one first cradle plate protrusion.

16. The fixture of claim 11, wherein the second cradle plate first edge comprises at least one second cradle plate protrusion (225), and the mounting plate comprises at least one second indentation (118) configured to receive the at least one second cradle plate protrusion.

17. The fixture of claim 1, further comprising at least one spacer (300).

18. The fixture of claim 17, wherein the spacer has a spacer perimeter (310) defining a spacer top surface (320) and a spacer bottom surface (330), said spacer comprising at least two spacer holes (340) passing from the spacer top surface through the spacer bottom surface, wherein the spacer perimeter has a first size and shape corresponding to a second size and shape of the mounting plate perimeter, and wherein the at least two spacer holes are configured to substantially align with the at least two mounting holes.

\* \* \* \* \*